United States Patent
Sogaard Rasmussen

[11] Patent Number: 5,134,717
[45] Date of Patent: Jul. 28, 1992

[54] RADIO TELEPHONE WITH REPERTORY DIALER

[75] Inventor: Poul E. Sogaard Rasmussen, Glostrup, Denmark

[73] Assignee: Motorola, Inc., Schaumburg, Ill.

[21] Appl. No.: 668,373

[22] Filed: Mar. 11, 1991

Related U.S. Application Data

[63] Continuation of Ser. No. 439,737, Nov. 21, 1989, abandoned.

[30] Foreign Application Priority Data

Nov. 26, 1988 [GB] United Kingdom ............... 8827670
Nov. 26, 1988 [GB] United Kingdom ............... 8827733

[51] Int. Cl.⁵ .................. H04B 1/38; H04M 1/276
[52] U.S. Cl. ................................. 455/89; 455/186.1; 379/354
[58] Field of Search ............... 379/355, 357, 354, 216, 379/144, 91; 455/89, 90, 185, 186, 344

[56] References Cited

U.S. PATENT DOCUMENTS

| | | | |
|---|---|---|---|
| 4,486,624 | 12/1984 | Duhl et al. | 455/89 |
| 4,639,225 | 1/1987 | Washizuka | 455/347 |
| 4,650,981 | 3/1987 | Foletta | 340/825.33 |
| 4,677,657 | 6/1987 | Nagata et al. | 379/91 |
| 4,680,787 | 7/1987 | Marry | 379/63 |
| 4,792,986 | 12/1988 | Garner et al. | 455/89 |
| 4,800,582 | 1/1989 | D'Agosto, III et al. | 379/354 |
| 4,860,342 | 8/1989 | Danner | 379/354 |
| 4,879,744 | 11/1989 | Tasaki et al. | 379/91 |
| 4,899,377 | 2/1990 | Bauer et al. | 379/354 |
| 4,903,322 | 2/1990 | Inahara et al. | 455/34 |
| 4,907,264 | 3/1990 | Seiler et al. | 379/354 |
| 4,914,691 | 3/1990 | Berger | 379/354 |

FOREIGN PATENT DOCUMENTS

| | | |
|---|---|---|
| 34446606 | 6/1986 | Denmark . |
| 3326827 | 6/1988 | Denmark . |
| 2252680 | 1/1988 | European Pat. Off. . |
| 3702509 | 8/1988 | Fed. Rep. of Germany . |
| 60-233967 | 11/1985 | Japan . |
| 61-93765 | 5/1986 | Japan . |
| 2192115 | 12/1987 | United Kingdom . |

*Primary Examiner*—Reinhard J. Eisenzopf
*Assistant Examiner*—Lisa D. Charouel
*Attorney, Agent, or Firm*—Kenneth W. Bolvin

[57] ABSTRACT

A radio (2) having: a first memory (34) for storing first information items; memory receiving slot (18) for temporarily receiving a second memory (20, 36) for storing second items of information; microprocessor (30) for accessing both said first and second memories; and user selective transfer device (42, 44) for causing an information item from one of the memories to be transferred to the other of the memories. In a preferred form the radio is a radiotelephone, the first and second items of information are telephone numbers and the second memory is a magnetic card or a smart card.

34 Claims, 2 Drawing Sheets

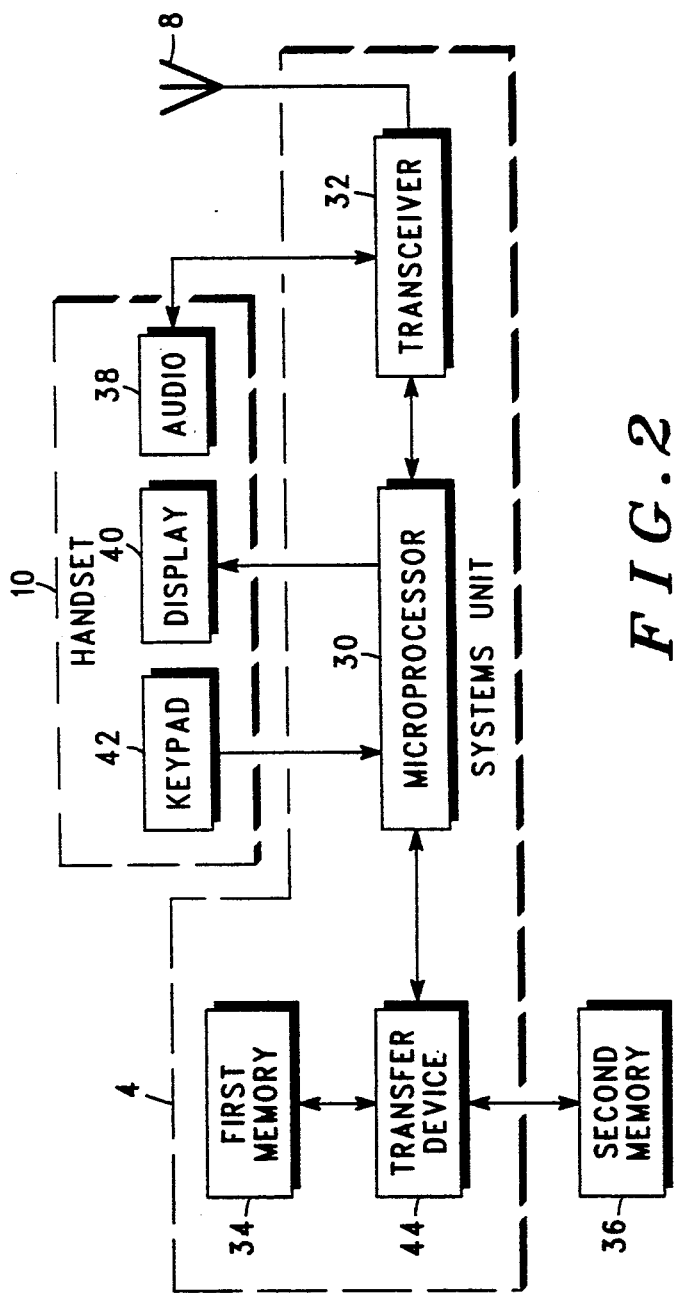
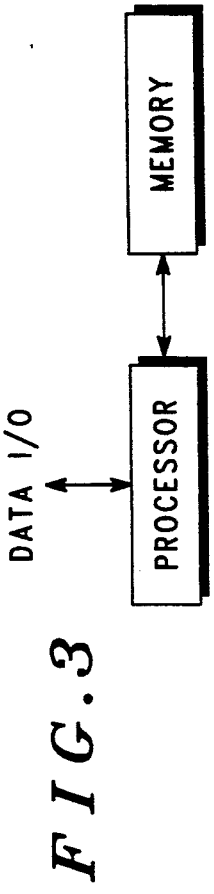
FIG. 2
FIG. 3

5,134,717

RADIO TELEPHONE WITH REPERTORY DIALER

This is a continuation of application Ser. No. 07/439,737, filed Nov. 21, 1989 and now abandoned.

This invention relates to radiotelephones and particularly to radiotelephones of the kind having first memories for holding first information items and being arranged to receive second memories for holding second information items.

An example of such a radiotelephone is one in which a first memory holds telephone numbers which can be dialled by a user via abbreviated dialling techniques which are well known in the art. Such a radiotelephone may be arranged to receive a memory carrier, for example in the form of a magnetic card, providing a second memory holding telephone numbers which the user can dial in a similar abbreviated way to the numbers in the first memory (see, for example Japanese patent application J62020454A). Such a facility allows a user to dial abbreviatedly with any suitably equipped radiotelephone from a personally chosen list of telephone numbers stored in his or her own magnetic card or other memory carrier.

It is an object of the present invention to provide a radiotelephone of the above kind wherein the utility of the first and second memory facilities may be enhanced.

SUMMARY OF THE INVENTION

In accordance with the present invention there is provided a radiotelephone having:
a first memory for storing first abbreviated dial information items including telephone numbers;
memory receiving means for temporarily receiving a second memory for storing second items abbreviated dial information including telephone numbers;
user selective memory access means for directly and separately accessing both said first and second memories and automatically dialling telephone numbers selected therefrom; and
user selective transfer means for causing an information item from one of said memories to be transferred to the other of said memories.

BRIEF DESCRIPTION OF DRAWINGS

One radiotelephone in accordance with the invention will now be described, by way of example only, with reference to the accompanying drawings, in which:

FIG. 2 shows a block schematic circuit diagram of part of the radiotelephone.

FIG. 3 shows a block diagram of a smart card.

DESCRIPTION OF PREFERRED EMBODIMENT

Figure 1:
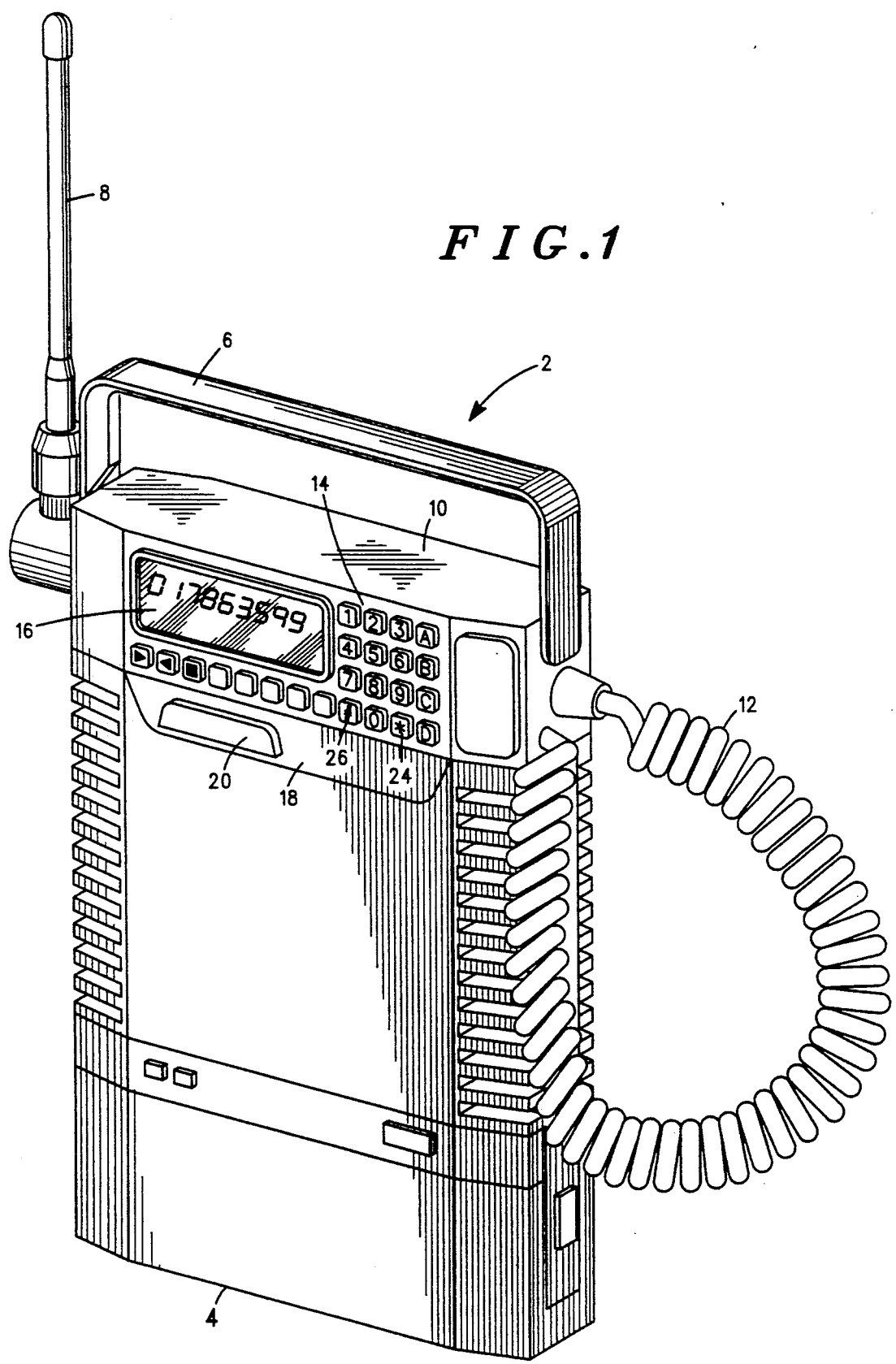
FIG. 1 shows a perspective view of the radiotelephone.

Referring firstly to FIG. 1, a radiotelephone 2 has a system unit 4 with carrying handle 6 and antenna 8, and a handset 10 removably located in the system unit and connected thereto by a coiled cord 12. The handset 10 is provided with a group of twenty-four keys 14 and a visual display 16, as well as mouth- and ear-pieces (not shown).

The system unit 4 is also provided, adjacent the handset location, with a receiving slot 18 for a memory card 20. As shown, a fully inserted memory card 20 protrudes from the slot so as to facilitate later removal.

In use of the radiotelephone, a user can abbreviatedly dial any of up to one hundred stored telephone numbers by first pressing a pre-designated "abbreviated dial" key (e.g. key 24) on the handset 10 and then pressing two numeric keys (00-99) defining a memory location in which is stored the number to be dialled. Memory locations 00-39 are pre-defined as being "user" locations for holding numbers stored in the user's memory card 20, while the remaining codes 40-99 are pre-defined as being "system" locations for holding numbers stored in the system unit 4.

Telephone numbers for abbreviated dialling may be stored directly in the memory locations 00-39 of the memory card 20 or in the system unit memory locations 40-99 by the user (i) pressing a pre-designated "store" key (e.g. key 26), (ii) entering the desired telephone number by pressing the relevant numeric keys, (iii) pressing the "store" key again, then (iv) pressing two numeric keys (00-39 or 40-99) defining the memory location in which the number is to be stored.

As an alternative to the above method of storing telephone numbers for future abbreviated dialling by entering each digit of the number as necessary, the radiotelephone 2 is also provided with the facility to transfer stored numbers between the memory locations of the system unit 4 and the memory locations of the memory card 20. Stored number may be transferred between the two types of memory locations by the user (i) pressing the "store" key twice, (ii) pressing two numeric keys (00-39 or 40-99) defining the memory location from which the stored number is to be transferred, (iii) pressing the "store" key again, the (iv) pressing two numeric keys (40-99 or 00-39) defining the memory location into which the stored number is to be transferred. It will be appreciated that, alternatively to pressing the "store" key twice to initiate the transfer, if desired another of the keys 14 may be dedicated for use as a "transfer" key.

Associated with each memory location is storage capacity for alphabetic information relating to the telephone number stored therein. Thus the name can be stored of the person whose number is stored. The data in the memory locations 00-39 of the memory card is only accessible by individual selection of the corresponding short number, 00-39. The facility is provided to transfer all stored numbers and associated alphabetic information from the memory card to the system unit and the facility is provided to search, scan and recall the data alphabetically. In this manner all the memory locations 00-99 can be searched.

It will be readily appreciated that this transfer facility enhances the usablility of abbreviated dialling with the radiotelephone by obviating the need for numbers to be re-keyed in order to be stored, and so removing the risk of mis-keying. Instead numbers may be transferred or "swapped" with ease.

Referring now also to FIG. 2, in block schematic form the radiotelephone 2 comprises in the system unit 4 a microprocessor 30, a radio transceiver 32 and a first set of memory locations 34. A removable set of second memory locations 36 may be provided (in the form of the memory card 20). An audio section 38, display section 40 and keypad section 42 are provided in the handset 10. Transfer means 44 are also provided in the system unit, under control of the microprocessor 30. In use of the radiotelephone 2, the microprocessor 30 receives inputs from the keypad section 42 and from the first and/or second sets of memory locations and controls the transceiver 32, the display section 40 and the transfer means 44 to operate as described above.

It will be understood that memory card 20 may be in the form of a magnetic card or, preferably, in the form of a "smart" card, whereby for example call charging and other transaction processing may be performed within the card. This smart card is illustrated in FIG. 3.

It will be appreciated that although in the above example there has been described the facility to transfer stored telephone numbers between first and second memories in a radiotelephone, the invention may be more broadly applied to the transfer of any stored information between first and second memories in any radio.

It will be appreciated that the invention has been described above by way of example only and that modifications to the above example may be made without departing from the inventive principle.

I claim:

1. A radiotelephone having means for coupling to a second memory, the radiotelephone comprising:
   a first memory having system memory locations for storing first abbreviated dial information items including telephone numbers;
   memory receiving means for temporarily receiving the second memory having user memory locations for storing second abbreviated dial information items including telephone numbers;
   user selective memory access means for selecting a system memory location of the first memory and directly accessing the selected system memory location and automatically dialling the telephone number stored therein; and
   user selective transfer means for selecting a memory location from said first and second memories and causing an abbreviated dial information item stored therein to be transferred to a memory location in the other of said memories.

2. A radiotelephone according to claim 1 wherein the memory receiving means is arranged to receive the second memory comprising a magnetic card.

3. A radiotelephone according to claim 1 wherein the memory receiving means is arranged to receive the second memory comprising a smart card having processing capacity and solid state memory.

4. A radiotelephone according to claim 1, wherein the capacity is provided for the telephone numbers to be accompanied by alphabetic information, and wherein transfer means are provide for causing all telephone numbers and accompanying alphabetic information in the second memory to be transferred to the first memory and means are provided for carrying out searching operations on the basis of the alphabetic information on the information items in the first memory after such a transfer.

5. A radiotelephone according to claim 1 wherein the transfer means is arranged to duplicate the information item to said memory location in said other of said memories.

6. A radiotelephone comprising:
   a first memory having system memory locations identified by a first set of abbreviated dial codes, for storing first abbreviated dial information items including telephone numbers;
   memory receiving means for temporarily receiving a second memory having user memory locations identified by a second set of abbreviated dial codes, for storing second abbreviated dial information items including telephone numbers;
   user selective memory access means for entering a code of the first set of abbreviated dial codes and, in response thereto, directly accessing a selected system memory location of the first memory and automatically dialling a telephone number selected therefrom;
   user selective memory access means for entering a code of the second set of abbreviated dial codes and in response thereto, directly accessing a selected user memory location of the second memory and automatically dialling a telephone number selected therefrom; and
   user selective transfer means for causing an abbreviated dial information item from one of said first and second memories, identified by a code of one of said first and second sets of abbreviated dial codes, to be transferred to a memory location in the other of said memories identifiable by a code of the other of said sets of abbreviated dial codes.

7. A radiotelephone according to claim 6 wherein the memory receiving means is arranged to receive the second memory comprising a magnetic card.

8. A radiotelephone according to claim 6 wherein the memory receiving means is arranged to receive the second memory comprising a smart card having processing capacity and solid state memory.

9. A radiotelephone according to claim 6 wherein the capacity is provided for the telephone numbers to be accompanied by alphabetic information, and wherein transfer means are provided for causing all telephone numbers and accompanying alphabetic information in the second memory to be transferred to the first memory and means are provided for carrying out searching operations on the basis of the alphabetic information on the information items in the first memory after such a transfer.

10. A radiotelephone according to claim 6 wherein the transfer means is arranged to duplicate the information item to said memory location in said other of said memories.

11. A radiotelephone having means for coupling a second memory, the radiotelephone comprising:
    a first memory for storing first abbreviated dial information items including telephone numbers;
    memory receiving means for temporarily receiving the second memory for storing second abbreviated dial information items including telephone numbers;
    user selective memory access means for accessing said first memory, selecting an abbreviated dial information item in said first memory and automatically dialing the telephone number included therein;
    user selective memory access means for accessing said second memory, selecting an abbreviated dial information item in said second memory and automatically dialling the telephone number included therein; and
    user selective transfer means for selectively identifying an abbreviated dial information item in one of said memories and causing it to be transferred to the other of said memories for use selective access, selection and automatic dialling form the other of said memories.

12. A radiotelephone according to claim 11 wherein the memory receiving means is arranged to receive the second memory comprising a magnetic card.

13. A radiotelephone according to claim 11 wherein the memory receiving means is arranged to receive the second memory comprising a smart card having processing capacity and solid state memory.

14. A radiotelephone according to claim 11 wherein the capacity is provided for the telephone numbers to be accompanied by alphabetic information, and wherein transfer means are provided for causing all telephone numbers and accompanying alphabetic information in the second memory to be transferred to the first memory and means are provided for carrying out searching operations on the basis of the alphabetic information on the information items in the first memory after such a transfer.

15. A radiotelephone according to claim 11 wherein the transfer means is arranged to duplicate the information item to said memory location in said other of said memories.

16. A radiotelephone having means for coupling to a second memory, the radiotelephone comprising:
a first memory for storing first abbreviated dial information items including telephone numbers;
memory receiving means for temporarily receiving the second memory for storing second abbreviated dial information items including telephone numbers;
manual input means for manually inputting information items into said first and second memories;
user selective memory access means for accessing said first memory, for selectively writing information items therein in response to the manual input means and for selecting an abbreviated dial information item in said first memory and automatically dialling the telephone number included therein; and
user selective transfer means for selectively identifying an abbreviated dial information item in one of said memories and causing it to be automatically transferred to the other of said memories for user selective access, selection and automatic dialling from the other of said memories.

17. A radiotelephone according to claim 16 wherein the memory receiving means is arranged to receive the second memory comprising a smart card having processing capacity and solid state memory.

18. A radiotelephone according to claim 16 wherein the capacity is provided for the telephone numbers to be accompanied by alphabetic information, and wherein transfer means are provided for causing all telephone numbers and accompanying alphabetic information in the second memory to be transferred to the first memory and means are provided for carrying out searching operations on the basis of the alphabetic information on the information items in the first memory after such a transfer.

19. A radiotelephone according to claim 16 wherein the transfer means is arranged to duplicate the information item to said memory location in said other of said memories.

20. A method of operating a radiotelephone comprising a fixed memory having system memory locations identified by a first set of abbreviated dial codes, and a removable memory having user memory locations identified by a second set of abbreviated dial codes, the method comprising the steps of:
storing first abbreviated dial information items including telephone numbers in said system memory locations;
storing second abbreviated dial information items including telephone numbers in said user memory locations;
providing user selective memory access means for entering codes of the first and second sets of abbreviated dial codes;
entering a code of the first set of codes and, in response thereto, directly accessing a selected system memory location of the first memory and automatically dialling a telephone number selected therefrom;
user selectively causing an information item from a location in said fixed memory to be transferred to a location in said removable memory; and
entering the code of the new location of the abbreviated dial information item and, in response thereto, directly accessing that memory location in the removable memory and automatically dialling the telephone number selected therefrom.

21. A method according to claim 20 comprising the further step of removing the removable memory from the radiotelephone, physically transferring it another radiotelephone, transferring the abbreviated dial information item from the removable memory to a user selected location in a fixed memory of the other radiotelephone, entering the code of the selected location of the abbreviated dial information item in the fixed memory of the other telephone and, in response thereto, directly accessing that memory location in the fixed memory and automatically dialling the telephone number selected therefrom.

22. A method according to claim 20 wherein the step of causing transfer of the information item causes a duplication of that item.

23. A radiotelephone comprising:
a first memory having system memory locations identified by a first set of abbreviated dial codes, for storing first abbreviated dial information items including telephone numbers;
memory receiving means for temporarily receiving a smart card comprising processing means and a second, solid state, memory having user memory locations identified by a second set of abbreviated dial codes, for storing second abbreviated dialling information items including telephone numbers;
user selective memory access means for entering a code of the first set of abbreviated dial codes and, in response thereto, directly accessing a selected system memory location of the first memory and automatically dialling a telephone number selected therefrom;
user selective memory access means for entering a code of the second set of abbreviated dial codes and, in response thereto, directly accessing a selected user memory location of the second memory and automatically dialling a telephone number selected therefrom; and
user selective transfer means for causing an abbreviated dial information item from one of said first and second memories, identified by a code of one of said first and second set of abbreviated dial codes, to be transferred to a memory location in the other of said memories identifiable by a code of the other of said sets of abbreviated dial codes.

24. A radiotelephone according to claim 23 wherein capacity is provided for the telephone numbers to be accompanied by alphabetic information, and wherein transfer means are provided for causing all telephone numbers and accompanying alphabetic information in the second memory to be transferred to the first memory and means are provided for carrying out searching operations on the basis of the alphabetic information on the information items in the first memory after such a transfer.

25. A radiotelephone according to claim 23 wherein the transfer means is arranged to duplicate the information item to said memory location in said other of said memories.

26. A radiotelephone having means for coupling to a smart card comprising processing means and a second, solid state, memory, the radiotelephone comprising:
   a first memory for storing first abbreviated dial information items including telephone numbers:
   memory receiving means for temporarily receiving the smart card for storing second abbreviated dial information items including telephone numbers in said second memory;
   user selective memory access means for accessing said first memory, selecting an abbreviated dial information item in said first memory and automatically dialling the telephone number included therein;
   user selective memory access means for accessing said second memory, selecting an abbreviated dial information item in said second memory and automatically dialling the telephone number included therein; and
   user selective transfer means for selectively identifying an abbreviated dial information item in one of said memories and causing it to be transferred to the other of said memories for user selective access, selection and automatic dialling from the other of said memories.

27. A radiotelephone according to claim 26 wherein the capacity is provided for the telephone numbers to be accompanied by alphabetic information, and wherein transfer means are provided for causing all telephone numbers and accompanying alphabetic information in the second memory to be transferred to the first memory and means are provided for carrying out searching operation on the basis of the alphabetic information on the information items in the first memory after such a transfer.

28. A radiotelephone according to claim 26 wherein the transfer means is arranged to duplicate the information item to said memory location in said other of said memories.

29. A radiotelephone having means for coupling to a smart card comprising processing means and a second, solid state memory, the radiotelephone comprising:
   a first memory for storing first abbreviated dial information items including telephone numbers;
   memory receiving means for temporarily receiving a smart card for storing second abbreviated dial information items including telephone numbers in said second memory;
   manual input means for manually inputing information items into said first and second memories;
   user selective memory access means for accessing said first memory, for selectively writing information items therein in response to the manual input means and for selecting an abbreviated dial information item in said first memory and automatically dialling the telephone number included therein;
   user selective memory access means for accessing said second memory, for selectively writing information items therein in response to the manual input means, and for selecting an abbreviated dial information item in said second memory and automatically dialling the telephone number included therein; and
   user selective transfer means for user selectively identifying an abbreviated dial information item in one of said memories and causing it to be automatically transferred to the other of said memories for user selective access, selection and automatic dialling from the other of said memories.

30. A radiotelephone according to claim 29 wherein the capacity is provided for the telephone numbers to be accompanied by alphabetic information, and wherein transfer means are provided for causing all telephone numbers and accompanying alphabetic information in the second memory to be transferred to the first memory and means are provided for carrying out searching operation of the basis of the alphabetic information on the information items in the first memory after such a transfer.

31. A radiotelephone according to claim 29 wherein the transfer means is arranged to duplicate the information item to said memory location in said other of said memories.

32. A method of operating a radiotelephone comprising a fixed memory having system memory locations identified by a first set of abbreviated dial codes and a removable smart card comprising processing means and a second, solid state memory having user memory locations identified by a second set of abbreviated dial codes, the method comprising the steps of:
   storing first abbreviated dial information items including telephone numbers in said system memory locations;
   storing second abbreviated dial information items including telephone numbers in said user memory locations;
   providing user selective memory access means for entering codes of the first and second sets of abbreviated dial codes;
   entering a code of the first set of codes and, in response thereto, directly accessing a selected system memory location of the first memory and automatically dialling a telephone number selected therefrom;
   user selectively causing an information item from a location in said fixed memory to be transferred to a location in said removable memory; and
   entering the code of the new location for the abbreviated dial information item and, in response thereto, directly accessing that memory location in the removable memory and automatically dialling the telephone number selected therefrom.

33. A method according to claim 32 comprising the further step of removing the smart card from the radiotelephone, physically transferring it to another radiotelephone, transferring the abbreviated dial information item from the second memory to a user selected location in a fixed memory of the other radiotelephone, entering the code of the selected location of the abbreviated dial information item in the fixed memory of the other telephone and, in response thereto, directly accessing that memory location in the fixed memory and automatically dialling the telephone number selected therefrom.

34. A method according to claim 32 wherein the step of causing transfer of the information item causes a duplication of that item.

* * * * *